(12) United States Patent
Lin et al.

(10) Patent No.: US 9,272,769 B2
(45) Date of Patent: Mar. 1, 2016

(54) JOINT FOR COMPOSITE WINGS

(71) Applicant: The Boeing Company, Seal Beach, CA (US)

(72) Inventors: Chun-Liang Lin, Bellevue, WA (US); Ryan M Mahn, Lake Stevens, WA (US); Karl B Lee, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 303 days.

(21) Appl. No.: 13/675,809

(22) Filed: Nov. 13, 2012

(65) Prior Publication Data

US 2014/0131518 A1    May 15, 2014

(51) Int. Cl.
| | |
|---|---|
| *B64C 3/26* | (2006.01) |
| *B64F 5/00* | (2006.01) |
| *B64C 1/26* | (2006.01) |

(52) U.S. Cl.
CPC ... *B64C 3/26* (2013.01); *B64C 1/26* (2013.01); *B64F 5/00* (2013.01); *Y10T 29/49622* (2015.01)

(58) Field of Classification Search
CPC .......................... B64C 1/26; B64C 2001/0072
USPC .............................. 244/123.1, 123.3, 131, 132
See application file for complete search history.

(56) References Cited

U.S. PATENT DOCUMENTS

| | | | |
|---|---|---|---|
| 5,538,589 A | 7/1996 | Jensen et al. | |
| 6,562,436 B2 | 5/2003 | George et al. | |
| 7,195,418 B2 | 3/2007 | Durand et al. | |
| 8,573,539 B2 * | 11/2013 | Honorato Ruiz | 244/123.1 |
| 2006/0204364 A1 | 9/2006 | Li et al. | |
| 2011/0284693 A1 | 11/2011 | Barnard et al. | |
| 2011/0303357 A1 | 12/2011 | Plaza et al. | |
| 2012/0104168 A1 | 5/2012 | Latorre Plaza et al. | |
| 2013/0287995 A1 * | 10/2013 | Deobald et al. | 428/120 |

FOREIGN PATENT DOCUMENTS

| | | |
|---|---|---|
| CN | 101674929 B | 3/2014 |
| EP | 2032432 B1 | 7/2010 |

(Continued)

OTHER PUBLICATIONS

Niu, Michael C. Y. (1992). Composite Airframe Structures—Practical Design Information and Data (3rd Edition). AD Adaso/Adastra Engineering LLC. (pp. 327-348, 434-436).*

Korean Intellectual Property Office; Office Action issued in Korean Patent Application No. 10-2013-0128067 dated Apr. 1, 2015.

(Continued)

*Primary Examiner* — Brian M O'Hara
*Assistant Examiner* — Michael Kreiner
(74) *Attorney, Agent, or Firm* — Parsons Behle & Latimer

(57) ABSTRACT

A wing joint including a T-chord and a splice plate for connecting an inboard wing panel assembly and an outboard wing panel assembly. The wing panel assemblies include a stringer co-bonded or co-cured with a wing skin. The webbing and cap of the stringer may be trimmed to expose a noodle and base flange. The noodle and base flange interface with the bottom of the T-chord and the wing skin interfaces with the splice plate. The exposed noodle may be non-flush with the base flange of the trimmed stringer. The bottom of the T-chord may include a groove to accommodate a non-flush noodle so that a gap does not exist between the T-chord and the base flange. Alternatively, shims may be used to compensate for a non-flush noodle or the base flange and web may include sacrificial plies permitting the base flange and web to be trimmed flush with the noodle.

16 Claims, 7 Drawing Sheets

(56) References Cited

FOREIGN PATENT DOCUMENTS

| WO | WO2011086222 | A1 | 7/2011 |
| WO | WO2011117454 | A1 | 9/2011 |
| WO | WO2011117554 | | 9/2011 |
| WO | WO2011146194 | | 11/2011 |
| WO | WO2011158015 | A2 | 12/2011 |

OTHER PUBLICATIONS

Chinese Intellectual Property Office; Office Action issued in CN Patent Application No. 2013105711645; dated Sep. 1, 2015.

Australian Government IP Australia, Patent Examination Report No. 2 for Application No. 2013245438 dated Nov. 4, 2015.

* cited by examiner

JOINT FOR COMPOSITE WINGS

BACKGROUND

1. Field of the Disclosure

The configurations described herein relate to a joint for composite wings. The joint may be for a lower side-of-body joint of an aircraft.

2. Description of the Related Art

Bolted side-of-body joints may be used to connect wings to the fuselage of an aircraft. One design of a side-of-body joint 200 presently used to connect a wing to a fuselage is shown in FIG. 12. The joint 200 includes a double plus chord 210 that includes a vertical portion 211, an upper inboard portion 212, a lower inboard portion 213, an upper outboard portion 214, and a lower outboard portion 215. An inboard wing panel assembly 220 is connected to the inboard side of the double plus chord 210 and an outboard wing panel assembly 230 is connected to the outboard side of the double plus chord 210.

The inboard wing panel assembly 220 includes a stringer 260 connected to an inboard wing skin 240 and the outboard wing panel assembly 230 includes a stringer 260 connected to an outboard wing skin 250. The stringer 260 includes a base flange 261 on the bottom of the stringer 260 and a cap 263 located on the top with a web 262 connecting the cap 263 to the base flange 261. The base flange 261 of the stringer 260 is connected to the inboard wing skin 240. The base flange 261 may be bonded to the inboard wing skin 240.

The cap 263 is connected to the upper inboard portion 212 of the double plus chord 210 by a plurality of fasteners 281. A portion of the web 262 and base flange 261 of the stringer 260 is cut so that base flange 261 of the stringer 260 does not overlap the lower inboard portion 213 of the double plus chord 210. A radius filler plate 291 is positioned above the base flange 261. Fasteners 290 connect the radius filler plate 291 to the base flange 261 and the inboard wing skin 240, which clamp the inboard wing skin 240 and base flange 261 to form a crack arrestment mechanism. Only the inboard wing skin 240 of the inboard wing panel assembly 220 is positioned below the lower inboard portion 213 of the double plus chord 210. The inboard wing skin 240 is positioned between the lower inboard portion 213 of the double plus chord 210 and a splice plate 270. Fasteners 280 connect the splice plate 270 to the lower inboard portion 213 of the double plus chord 210 securing the inboard wing skin 240 to the joint 200.

The outboard wing panel assembly 230 is constructed the same way as the inboard wing panel assembly 220. Fasteners 281 are used to connect the cap 263 of the stringer 260 to the upper outboard portion 214 of the double plus chord 210. Fasteners 280 connect the outboard wing skin 250 to the splice plate 270 and the lower outboard portion 215 of the double plus chord 210. The connection of one portion of a wing panel assembly to a first portion of a joint, and the connection of a second portion of a wing panel assembly to a second portion of the joint may result in differing forces to be applied to the different portions of the assembly.

SUMMARY

It may be beneficial to provide a joint that secures both portions of a wing panel assembly with a clamping configuration having a single interface.

One configuration is a wing joint comprising a T-chord, a splice plate, an inboard wing panel assembly, and an outboard wing panel assembly. The T-chord includes an inboard portion, an outboard portion, and a vertical portion. The splice plate has an inboard portion and an outboard portion. The wing joint includes at least one inboard stringer connected, such as being bonded, to the inboard wing skin to form an inboard wing panel assembly and at least one outboard stringer connected, such as being bonded, to the outboard wing skin to form an outboard wing panel assembly. A portion of the inboard wing panel assembly is positioned between the inboard portion of the T-chord and the inboard portion of the splice plate. A portion of the outboard wing panel assembly is positioned between the outboard portion of the T-chord and the outboard portion of the splice plate. A first plurality of fasteners connect the inboard portion of the T-chord with the inboard portion of the splice plate to secure the inboard wing panel assembly to the T-chord and the splice plate. A second plurality of fasteners connect the outboard portion of the T-chord with the outboard portion of the splice plate to secure the outboard wing panel assembly to the T-chord and the splice plate.

The outboard stringer and inboard stringer of the wing joint may each include a base flange, at least one web, and at least one noodle. The outboard stringer and inboard stringer may be blade stringers. The outboard stringer and inboard stringer may be I stringers. The I stringers may include a cap. The inboard stringer and outboard stringer may each be trimmed to expose at least one noodle. The inboard wing panel assembly may comprise a portion of an inboard wing skin, a portion of a base flange of an inboard stringer, and a portion of at least one exposed noodle. The outboard wing panel assembly may comprise a portion of an outboard wing skin, a portion of a base flange of an outboard stringer, and a portion of at least one exposed noodle.

The T-chord of the joint may include a first groove in the inboard portion to accommodate at least one exposed noodle of an inboard stringer and a second groove in the outboard portion to accommodate at least one exposed noodle of an outboard stringer. The joint may include a first shim positioned between the base flange of an inboard stringer and the inboard portion of the T-chord and a second shim positioned between the base flange of the outboard stringer and the outboard portion of the T-chord. The first and second shims may be positioned adjacent to at least one exposed noodle. The joint may be a lower side-of-body joint for a composite wing assembly.

The inboard portion of the T-chord may include at least one cutout and the outboard portion of the T-chord may also include at least one cutout. A portion of the web of the inboard stringer may extend into the cutout on the inboard portion of the T-chord and a portion of the web of the outboard stringer may extend into the cutout on the outboard portion of the T-chord. The inboard and outboard portions of the T-chord may include at least three longitudinal rows of fasteners securing the wing panel assemblies to the T-chord and the splice plate. The cutouts on the inboard and outboard portions of the T-chord may extend between fasteners in at least one row of the fasteners. The cutouts on the inboard and outboard portions of the T-chord may extend between fasteners in at least two rows of the fasteners. The T-chord and splice plate of the joint may be comprised of titanium or aluminum.

One configuration is a method of forming a wing joint. The method comprises forming an inboard wing panel assembly and forming an outboard wing panel assembly. The inboard wing panel assembly comprises at least one inboard stringer connected to an inboard wing skin, the stringer including a base flange, at least one web, and at least one noodle. The outboard wing panel assembly comprises at least one outboard stringer connected to an outboard wing skin, the stringer including a base flange, at least one web, and at least one noodle. The method includes trimming the web of the inboard stringer to expose at least one noodle and trimming the web of the outboard stringer to expose at least one noodle. The method includes positioning a portion of the inboard wing panel assembly between an inboard portion of a T-chord and an inboard portion of a splice plate and securing the inboard wing panel assembly to the T-chord and splice plate with a plurality of fasteners. The portion of the inboard wing panel assembly including a portion of the inboard wing skin, a portion of the base flange of the inboard stringer, and at least one exposed noodle. The method includes positioning a portion of the outboard wing panel assembly between an outboard portion of a T-chord and an outboard portion of a splice plate and securing the outboard wing panel assembly to the T-chord and splice plate with a plurality of fasteners. The portion of the outboard wing panel assembly including a portion of the outboard wing skin, a portion of the base flange of the outboard stringer, and at least one exposed noodle.

The method may include providing a groove in the inboard portion of the T-chord to accommodate at least one exposed noodle of the inboard stringer and providing a groove in the outboard portion of the T-chord to accommodate at least one exposed noodle of the outboard stringer. The method may include providing at least a first shim positioned between the inboard wing panel assembly and the inboard portion of the T-chord and providing at least a second shim positioned between the outboard wing panel assembly and the outboard portion of the T-chord. The shims may be positioned adjacent to at least one exposed noodle.

The stringers or the method may be composite materials comprised of a plurality of plies. The method may include adding additional sacrificial plies to the stringers prior to forming the wing panel assemblies, the sacrificial plies permitting the removal of at least a portion of the sacrificial plies to provide that an exposed noodle is flush without reducing the load bearing capability of the wing panel assemblies. The forming an inboard wing panel assembly may further comprise co-curing the inboard wing skin and the inboard stringer and forming an outboard wing panel assembly may further comprise co-curing the outboard wing skin and the outboard stringer. The forming an inboard wing panel assembly may further comprise co-bonding the inboard wing skin and the inboard stringer and forming an outboard wing panel assembly may further comprise co-bonding the outboard wing skin and the outboard stringer.

One configuration is a wing joint that comprises a first clamp plate, a second clamp plate, and a wing panel assembly. The wing panel assembly is comprised of a stringer bonded to a wing skin. A portion of the wing panel assembly is secured between the first clamp plate and the second clamp plate. The stringer of the wing panel assembly has been trimmed to expose a noodle, which is part of the portion of the wing panel assembly secured between the first clamp plate and the second clamp plate.

Figure 1:
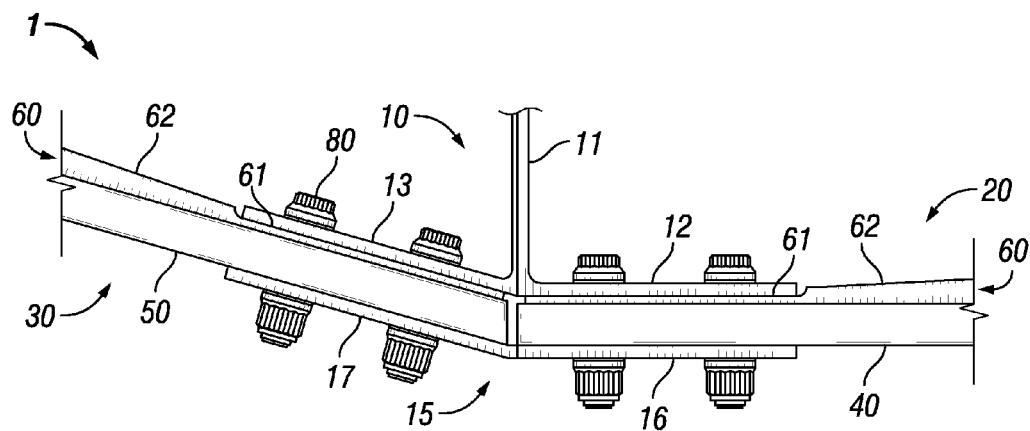
FIG. 1 shows a configuration of a joint for a composite wing.

While the disclosure is susceptible to various modifications and alternative forms, specific configurations have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows a configuration of a wing joint 1. The wing joint 1 includes a first clamp plate 10 and a second clamp plate 15 used together to secure an inboard wing panel assembly 20 and an outboard wing panel assembly 30. The first clamp plate 10 may be a T-chord and the second clamp plate may be a splice plate. Hereinafter, the first clamp plate will be referred to as a T-chord 10 and the second clamp plate will be referred to as a splice plate 15. The T-chord 10 includes a vertical portion 11, an inboard portion 12, and an outboard portion 13. The splice plate 15 includes an inboard portion 16 and an outboard portion 17. The T-chord 10 and splice plate 15 are used to connect together an inboard wing panel assembly 20 and an outboard wing panel assembly 30.

The inboard wing panel assembly 20 is comprised of an inboard wing skin 40 and a stringer 60. The inboard wing skin 40 and the stringer 60 may both be comprised of a composite material, which may be comprised of multiple layers of a material bonded and/or cured together. The material may be comprised of various materials used in the formation of composite materials. One example of such material is carbon fiber reinforced plastic. Likewise, the outboard wing panel assembly 30 is comprised of an outboard wing skin 50 and a stringer 60. As discussed above, the outboard wing skin 50 and the stringer 60 may also be co-bonded or co-cured. The stringer 60 used may be various stringers used to strengthen composite parts, such as an I stringer or a blade stringer.

Figure 8:
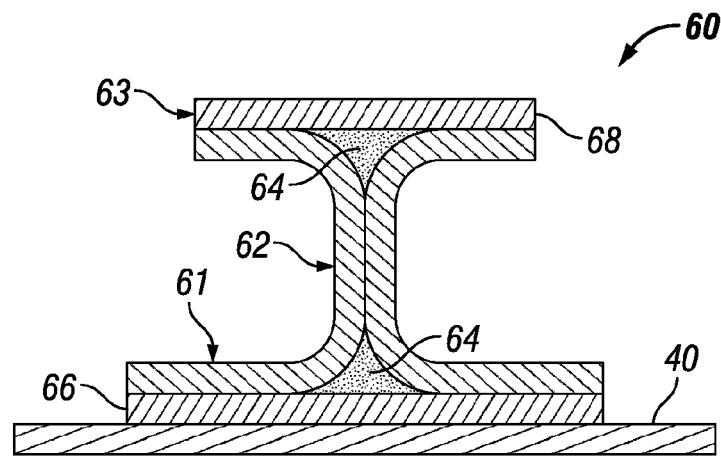
FIG. 8 shows an I stringer that may be used with the disclosed wing joint.

The stringer 60 is bonded to the wing skin 40, 50 to form a wing panel assembly 20, 30. The stringer 60 and wing skin 40, 50 may be co-cured so as to form a bond between the two components. After the wing panel assemblies 20, 30 are formed, the wing panel assemblies 20, may then be connected together with T-chord 10 and splice plate 15 to form a wing joint 1. The stringer 60 may include a base flange 61 and a web 62. If the stringer 60 is an I stringer, as shown in FIG. 8, then the stringer 60 may include a cap 63. The cap 63 and web 62 of the stringer 60 may be trimmed so that only the base flange 61 of the stringer 60 runs out into the wing joint 1. The cap 63 and web 62 may be trimmed to expose a noodle 64 or a plurality of noodles as discussed below.

An end portion of the inboard wing panel assembly 20 may be positioned between the inboard portion 12 of the T-chord 10 and the inboard portion 16 of the splice plate 15. As discussed above, the web 62 and cap 63 may be been trimmed so that only the base flange 61 of the stringer 60, which is bonded to the inboard wing skin 40, is positioned between the T-chord 10 and the splice plate 15. As discussed below, the stringer 60 may also include an exposed noodle(s) 64 that is also positioned between the T-chord 10 and the splice plate 15. A plurality of fasteners 80 connect the inboard portion 12 of the T-chord 10 to the inboard portion 16 of the splice plate 15, securing the inboard wing panel assembly 20 to the wing joint 1. Likewise, the outboard wing panel assembly 30 is connected to the outboard portion 13 of the T-chord 10 and the outboard portion 17 of the splice plate 15.

Figure 2:
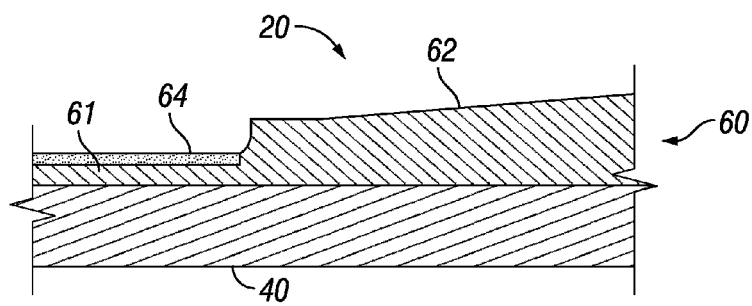
FIG. 2 shows a partial cross-section of a stringer bonded to a wing skin to form a wing panel assembly to be used with a configuration of a joint for a composite wing.

FIG. 2 shows a partial cross-section of a wing panel assembly 20 that includes a stringer 60 bonded to a wing skin 40. The web 62 and cap 63 have been trimmed to expose a noodle 64 on the base flange 61 of the stringer 60. Noodles 64 are typically unidirectional fibers that are used to fill a junction between portions of a stringer 60 as shown in FIG. 8. For example, an I stringer may be comprised of two "c" shaped brackets connected together back to back. A void may exist at both the top and bottom junctions where the back of the brackets meet. A noodle 64, which may be a unidirectional fiber, may be used to fill the void. The noodle 64 may be comprised of various materials, such as unidirectional carbon fiber reinforced plastic, laminated carbon fiber reinforced plastic, or glass fiber reinforced plastic. As shown in FIG. 2, the noodle 64 may not be flush with the base flange 61. If the noodle 64 is not flush with the base flange 61, the T-chord 10 or stringer 60 may be modified to accommodate the non-flush noodle 64, as discussed below.

Figure 3:
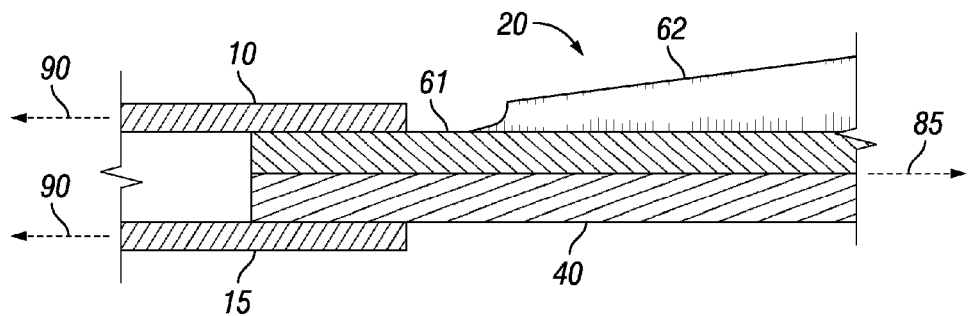
FIG. 3 shows a schematic showing the potential forces on a configuration of a joint for a composite wing.
Figure 12:
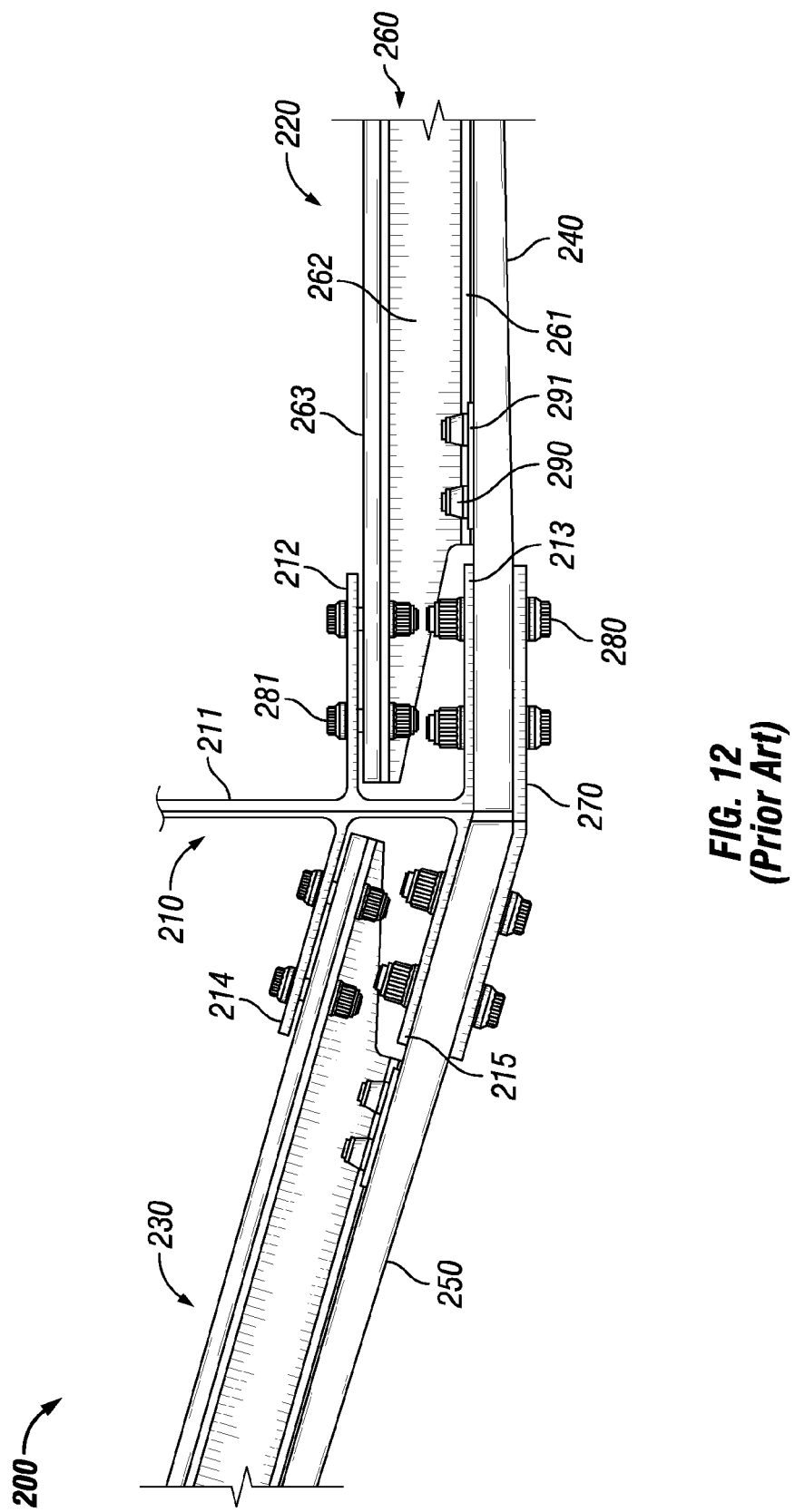
FIG. 12 shows a prior art joint for a composite wing.

FIG. 3 is a schematic showing the potential forces that may be applied to the wing joint 1. As both the inboard wing skin 40 and base flange 61 are secured to the T-chord 10 and the splice plate 15 at the same interface, the same tension force is applied to both components equally as shown by arrow 85. Further, the tension forces (arrows 90) on both the T-chord 10 and splice plate 15 are substantially equal and in the same direction, because the two components provide a single interface for capturing the wing panel assembly 20 in comparison to the multiple interfaces of the double plus chord 210 shown in FIG. 12.

Figure 4:
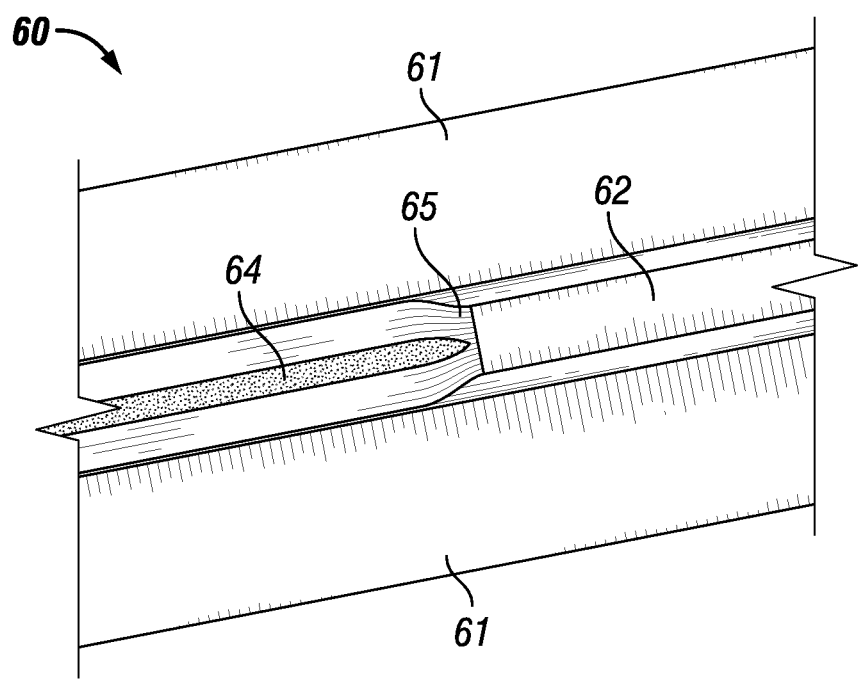
FIG. 4 shows a portion of a stringer that has been trimmed for use with a configuration of a joint for a composite wing.

FIG. 4 shows a portion of a stringer 60 that may be connected to the wing joint 1 of the present disclosure. The stringer 60 includes a base flange 61 and web 62 trimmed to expose a noodle 64. The stringer 60 may include a web and cap run out 65 where the trimmed web 62 interfaces with the exposed noodle 64. As discussed above, the noodle 64 may be comprised of unidirectional fiber and may fill a void between two interfaces in the stringer 60.

Figure 5A:
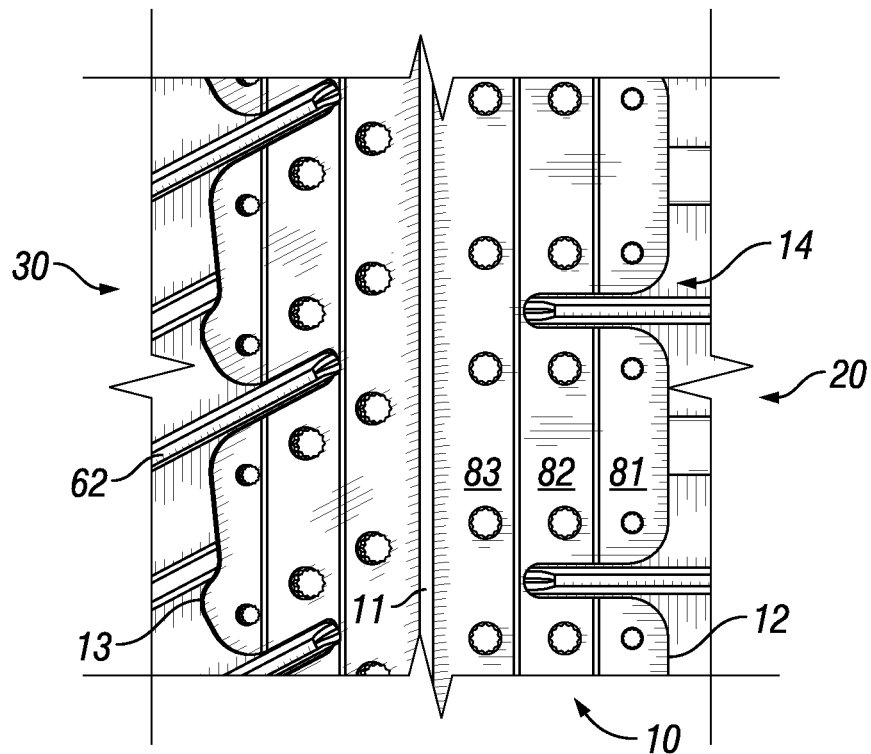
FIG. 5A shows a top view of a configuration of a joint for a composite wing.
Figure 5B:
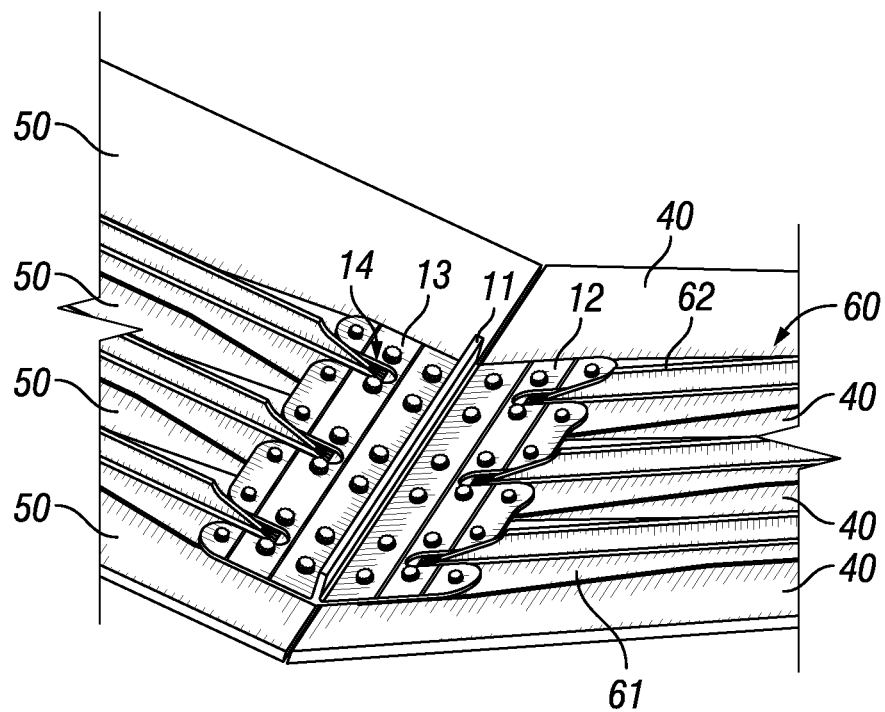
FIG. 5B shows a perspective view a configuration of a joint for a composite wing.

FIG. 5A and FIG. 5B show a configuration of T-chord 10 that may be used in the wing joint 1. The T-chord 10 may include a scalloped or cutout feature 14 that permits the web 62 of the stringer 60, such as the blade of a blade stringer, to extend between one or more rows of fasteners 80 that connect the T-chord 10 to a spice plate 15. The T-chord 10 may include a plurality of rows of fasteners 80. For example, the T-chord 10 may include a first row of fasteners 81, a second row of fasteners 82, and a third row of fasteners 83. The cutout feature 14 may protrude so it crosses the first and second rows of fasteners 81, 82 as shown in FIG. 5A and FIG. 5B. The T-chord 10 may include a plurality of cutout features 14. The use of the cutout feature 14 of the T-chord 10 may permit the stringer 60 to be more robust by permitting a longer length of web 62 along the stringer 60. The number and orientation of the cutout features 14 is for illustrative purposes only. The configuration, depth, and location of the cutout features 14, as well as the number of rows and configuration of fasteners, may be varied as would be appreciated by one of ordinary skill in the art having the benefit of this disclosure. For example, even the individual length of the cutout features 14 may be varied within a single T-chord 10.

Figure 6:
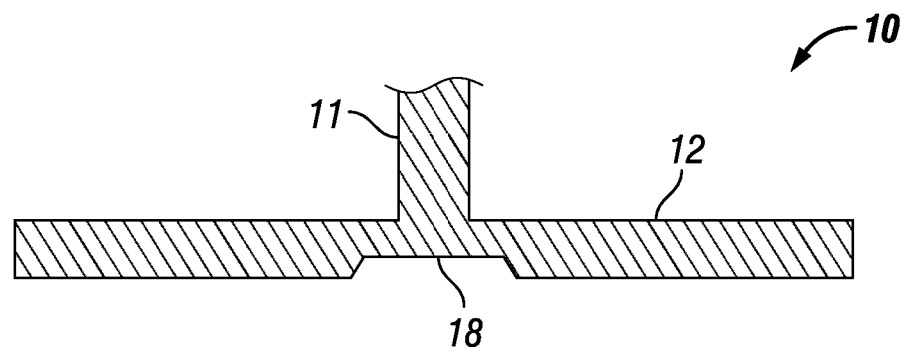
FIG. 6 shows a configuration of a T-chord that includes a groove to accommodate non-flush exposed noodles of a stringer.

FIG. 6 shows a partial cross-section of a configuration of T-chord 10 that includes at least one groove 18 on the bottom side of the inboard portion 12 of the T-chord 10. The groove 18 may be adapted to accommodate a non-flush noodle 64 present on the wing panel assemblies 20, 30. The insertion of the non-flush noodle 64 into the groove 18 may enable the interface between the T-chord 10 and wing panel assembly 20 to be flush. The T-chord 10 may include a plurality of grooves 18 in the bottom of both the inboard 12 and outboard 13 portions to accommodate a plurality of exposed noodles 64.

Figure 7:
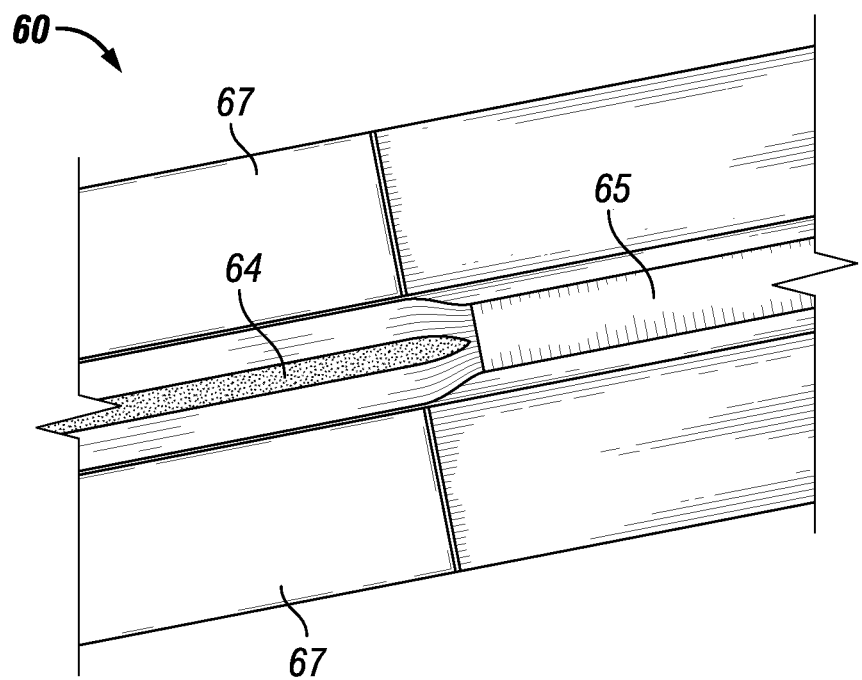
FIG. 7 shows a portion of one configuration of a trimmed stringer for use with a configuration of a joint for a composite wing with shims being positioned adjacent to a non-flush exposed noodle of a stringer.

FIG. 7 shows a configuration of a trimmed stringer 60 that includes shims 67 to accommodate for non-flush noodles 64. The shim(s) 67 are located adjacent to the non-flush noodle 64 between the base flange 61 and the T-chord 10. The shims 67 fill the gaps between the wing panel assembly 20, 30 and the T-chord 10 due to the noodle 64 being non-flush. The shims 67 are shown for illustrative purposes only as the shape, number, and configuration of the shims 67 may be varied, as would be appreciated by one of ordinary skill in the art having the benefit of this disclosure.

FIG. 8 shows a cross-section of an I stringer 60 bonded to a wing skin 40. The I stringer 60 includes a base flange 61, a web 62, and a cap 63. For co-bonded wing panels, the base flange 61 may include a base flange charge 66, which is not required for co-cured wing panels. The cap 63 may include a cap charge 68 for both co-bonded and co-cured wing panels. As shown, noodles 64 fill the gap between the web 62 and the cap 63 as well as the gap between the web 62 and the base flange 61. As discussed above, the cap 63 and web 62 may be trimmed on one end of the stringer 60 to expose the noodle 64. The exposed noodle 64 and base flange 61 may then interface with the bottom of the T-chord 10 when the wing panel assembly 20, the stringer 60 bonded to the wing skin 40, is secured to the T-chord 10 and the splice plate 15, as discussed above.

Figure 9:
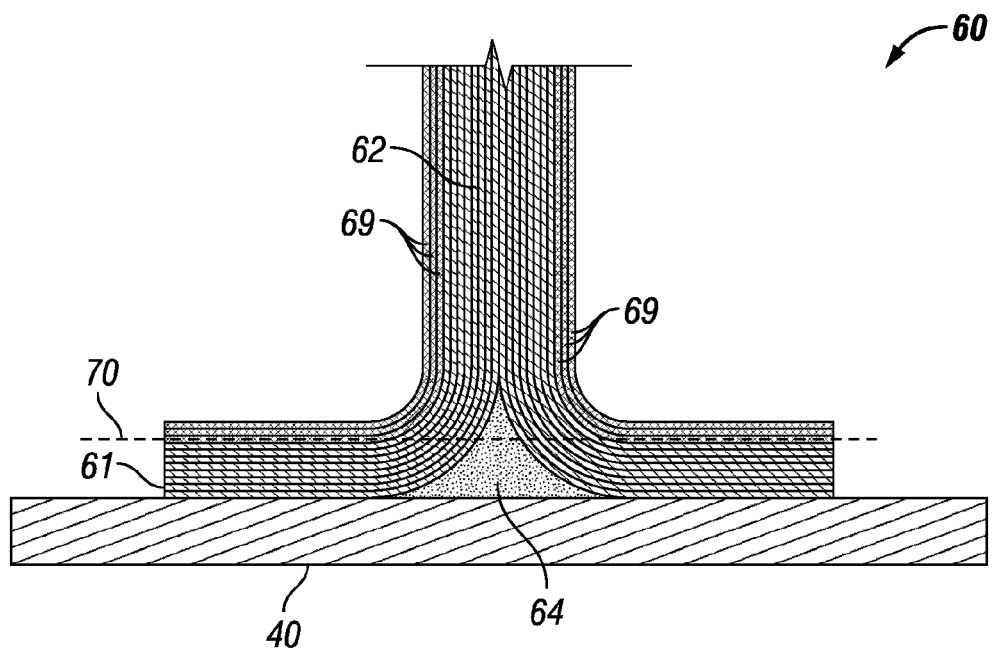
FIG. 9 shows a blade stringer having sacrificial plies that may be used with the disclosed wing joint.

FIG. 9 shows a cross-section of a blade stringer 60 that includes additional plies or layers, referred to herein as sacrificial plies 69, that permit the removal of material from the stringer 60 while maintaining the desired structural integrity of the stringer 60. As discussed above, the web 62 of the stringer 60 is trimmed to expose the noodle 64 and provide an interface between the stringer 60 and the T-chord 10. Upon exposing the noodle 64, the noodle 64 may not be flush with the base flange 61. To accommodate for a potential non-flush noodle 64, sacrificial plies 69 are added to the web 62 and base flange 61 of the stringer 60. The sacrificial plies permit the web 62 and base flange 61 to be trimmed down to a level 70, which is flush with the exposed noodle 64 while retaining a thickness of material of the stringer 60 that maintains its intended structural integrity.

Figure 10:
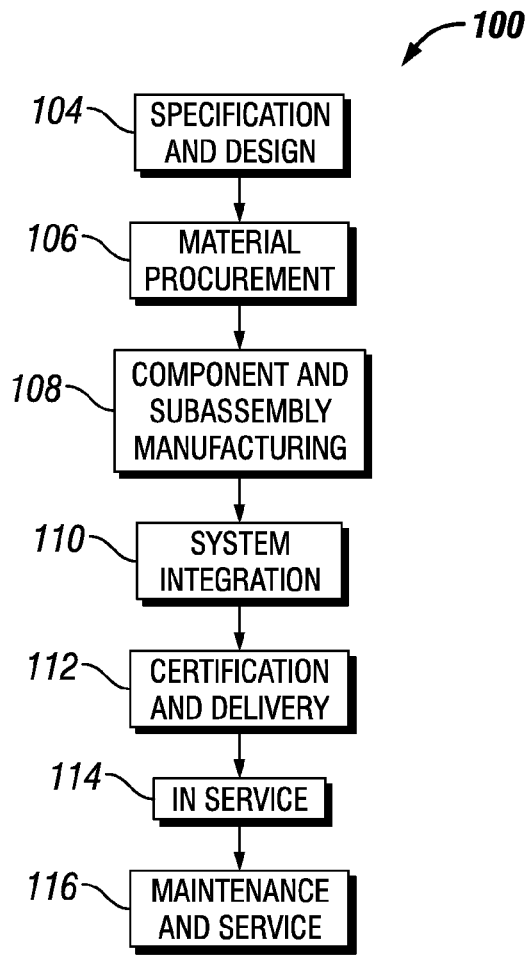
FIG. 10 is a flow diagram of aircraft production and service methodology in accordance with an advantageous configuration.
Figure 11:
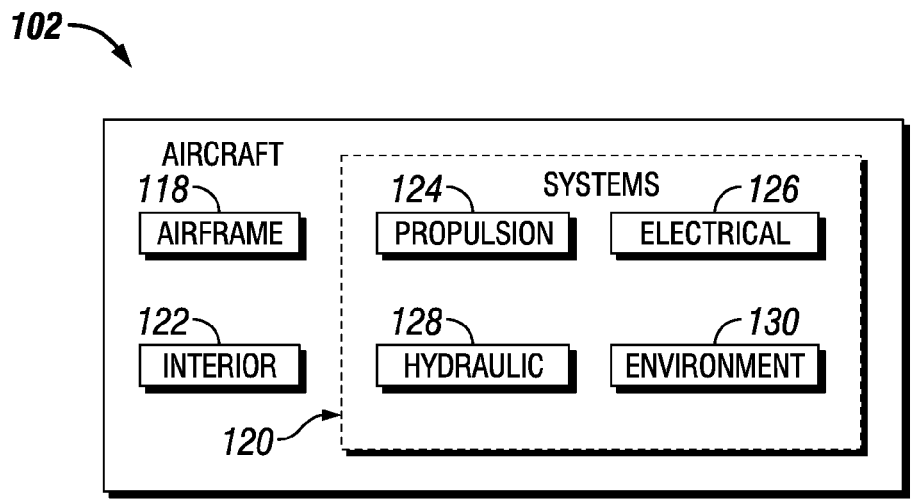
FIG. 11 is a block diagram of an aircraft in accordance with an advantageous configuration.

Referring more particularly to the drawings, configurations of the disclosure may be described in the context of an aircraft manufacturing and service method 100 as shown in FIG. 10 and an aircraft 102 as shown in FIG. 11. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service 114 by a customer, the aircraft 102 is scheduled for routine maintenance and service 116 (which may also include modification, reconfiguration, refurbishment, and so on).

Each of the processes of exemplary method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 11, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and method embodied herein may be employed during any one or more of the stages of the aircraft manufacturing and service method 100. For example, components or subassemblies corresponding to production process 108 may be fabricated or manufactured in a manner similar to components or subassemblies produced while the aircraft 102 is in service 114. Also, one or more apparatus configurations, method configurations, or a combination thereof may be utilized during the production processes 108 and 110, for example, by expediting assembly of or reducing the cost of an aircraft 102. Similarly, one or more of apparatus configurations, method configurations, or a combination thereof may be utilized while the aircraft 102 is in service 114, for example and without limitation, to maintenance and service 116.

Although this disclosure has been described in terms of certain preferred configurations, other configurations that are apparent to those of ordinary skill in the art, including configurations that do not provide all of the features and advantages set forth herein, are also within the scope of this disclosure. Accordingly, the scope of the present disclosure is defined only by reference to the appended claims and equivalents thereof.

| TABLE OF REFERENCE NUMERALS FOR FIGS. 1-12 | |
|---|---|
| 1 | wing joint |
| 10 | T-chord |
| 11 | vertical portion of T-chord |
| 12 | inboard portion of T-chord |
| 13 | outboard portion of T-chord |
| 14 | cutout feature in T-chord |
| 15 | splice plate |
| 16 | inboard portion of splice plate |
| 17 | outboard portion of splice plate |
| 18 | grooves in T-chord |
| 20 | inboard wing panel assembly |
| 30 | outboard wing panel assembly |
| 40 | inboard wing skin |
| 50 | outboard wing skin |
| 60 | stringer |
| 61 | base flange |
| 62 | web |
| 63 | cap |
| 64 | noodle |
| 65 | cap and web run out |

-continued

| TABLE OF REFERENCE NUMERALS FOR FIGS. 1-12 | |
|---|---|
| 66 | base flange charge |
| 67 | shim |
| 68 | cap charge |
| 69 | sacrificial plies |
| 70 | trimmed level |
| 80 | fastener |
| 81 | first row of fasteners |
| 82 | second row of fasteners |
| 83 | third row of fasteners |
| 85 | tension force on wing panel assembly |
| 90 | tension force on T-chord and splice plate |
| 200 | prior art wing joint |
| 210 | double plus chord |
| 211 | vertical portion of double plus chord |
| 212 | upper inboard portion of double plus chord |
| 213 | lower inboard portion of double plus chord |
| 214 | upper outboard portion of double plus chord |
| 215 | lower outboard portion of double plus chord |
| 220 | inboard wing panel assembly |
| 230 | outboard wing panel assembly |
| 240 | inboard wing skin |
| 250 | outboard wing skin |
| 260 | stringer |
| 261 | stringer base flange |
| 262 | stringer web |
| 263 | stringer cap |
| 270 | splice plate |
| 280 | fastener |
| 281 | fastener |
| 282 | fastener |
| 291 | radius filler |

What is claimed is:

1. A wing joint comprising:
   a T-chord having an inboard portion, an outboard portion, and a vertical portion;
   a splice plate having an inboard portion and an outboard portion;
   an inboard wing skin;
   an outboard wing skin;
   at least one inboard stringer connected to the inboard wing skin to form an inboard wing panel assembly, a portion of the inboard wing panel assembly positioned between the inboard portion of the T-chord and the inboard portion of the splice plate;
   a first plurality of fasteners connecting the inboard portion of the T-chord with the inboard portion of the splice plate to secure the inboard wing panel assembly to the T-chord and the splice plate;
   at least one outboard stringer connected to the outboard wing skin to form an outboard wing panel assembly, a portion of the outboard wing panel assembly positioned between the outboard portion of the T-chord and the outboard portion of the splice plate, the outboard string and the inboard string each comprising a base flange, at least one web, and at least one noodle, the outboard stringer and the inboard stringer each being trimmed to expose the at least one noodle;
   a second plurality of fasteners connecting the outboard portion of the T-chord with the outboard portion of the splice plate to secure the outboard wing panel assembly to the T-chord and the splice plate; and
   a first groove in the inboard portion of the T-chord to accommodate the at least one exposed noodle of the inboard stringer and a second groove in the outboard portion of the T-chord to accommodate the at least one exposed noodle of the outboard stringer.

2. The wing joint of claim 1, wherein the joint is a lower side-of-body joint for a composite wing assembly.

3. The wing joint of claim 1, the outboard stringer and the inboard stringer being blade stringers.

4. The wing joint of claim 1, the inboard portion of the T-chord comprising at least one cutout and the outboard portion of the T-chord comprising at least one cutout, a portion of the web of the inboard stringer extending into the cutout on the inboard portion the T-chord and a portion of the web of the outboard stringer extending into the cutout on the outboard portion of the T-chord.

5. The wing joint of claim 4, the first and second plurality of fasteners each comprising at least three longitudinal rows of fasteners, the at least one cutout on the inboard portion extending between fasteners in at least one row of fasteners and the at least one cutout on the outboard portion extending between fasteners in at least one row of fasteners.

6. The wing joint of claim 4, the first and second plurality of fasteners each comprising at least three longitudinal rows of fasteners, the at least one cutout on the inboard portion extending between fasteners in at least two rows of fasteners and the at least one cutout on the outboard portion extending between fasteners in at least two rows of fasteners.

7. The wing joint of claim 1, the outboard stringer and the inboard stringer being I stringers.

8. The wing joint of claim 7, the I stringers further comprising a cap.

9. The wing joint of claim 1, wherein the inboard wing panel assembly comprises a portion of the inboard wing skin, a portion of the base flange of the inboard stringer, and a portion of the at least one exposed noodle of the inboard stringer and wherein the outboard wing panel assembly comprises a portion of the outboard wing skin, a portion of the base flange of the outboard stringer, and a portion of the at least one exposed noodle of the outboard stringer.

10. The wing joint of claim 9, further comprising a first shim and a second shim, the first shim positioned between the base flange of the inboard stringer and the inboard portion of the T-chord, the first shim being adjacent to at least one exposed noodle of the inboard stringer, the second shim positioned between the base flange of the outboard stringer and the outboard portion of the T-chord, the second shim being adjacent to at least one exposed noodle of the outboard stringer.

11. A method of forming a wing joint, the method comprising:

forming an inboard wing panel assembly, the inboard wing panel assembly comprising at least one inboard stringer connected to an inboard wing skin, the at least one inboard stringer comprising a base flange, at least one web, and at least one noodle;

forming an outboard wing panel assembly, the outboard wing panel assembly comprising at least one outboard stringer connected to an outboard wing skin, the at least one outboard stringer comprising a base flange, at least one web, and at least one noodle;

trimming the at least one web of the inboard stringer to expose the at least one noodle;

trimming the at least one web of the outboard stringer to expose the at least one noodle;

positioning a portion of the inboard wing panel assembly between an inboard portion of a T-chord and an inboard portion of a splice plate, the portion of the inboard wing panel assembly including a portion of the inboard wing skin, a portion of the base flange of the inboard stringer, and the at least one exposed noodle of the inboard stringer;

providing a groove in the inboard portion of the T-chord to accommodate the at least one exposed noodle of the inboard stringer;

providing a groove in the outboard portion of the T-chord to accommodate the at least one exposed noodle of the outboard stringer;

securing the inboard wing panel assembly to the inboard portion of the T-chord and the inboard portion of the splice plate with a plurality of fasteners;

positioning a portion of the outboard wing panel assembly between an outboard portion of a T-chord and an outboard portion of a splice plate, the portion of the outboard wing panel assembly including a portion of the outboard wing skin, a portion of the base flange of the outboard stringer, and the at least one exposed noodle of the outboard stringer; and securing the outboard wing panel assembly to the outboard portion of the T-chord and the outboard portion of the splice plate with a plurality of fasteners.

12. The method of claim 11 further comprising:

providing at least a first shim positioned between the inboard wing panel assembly and the inboard portion of the T-chord, the first shim being adjacent to the at least one exposed noodle of the inboard stringer; and providing at least a second shim positioned between the outboard wing panel assembly and the outboard portion of the T-chord, the second shim being adjacent to the at least one exposed noodle of the outboard stringer.

13. The method of claim 11, wherein forming an inboard wing panel assembly further comprises co-curing the inboard wing skin and the inboard stringer and wherein forming an outboard wing panel assembly further comprises co-curing the outboard wing skin and the outboard stringer.

14. The method of claim 11, wherein forming an inboard wing panel assembly further comprises co-bonding the inboard wing skin and the inboard stringer and wherein forming an outboard wing panel assembly further comprises co-bonding the outboard wing skin and the outboard stringer.

15. The method of claim 11, wherein the stringers are composite materials comprised of a plurality of plies.

16. The method of claim 15 further comprising:

adding additional sacrificial plies to the inboard stringer and the outboard stringer prior to forming the inboard wing panel assembly and prior to forming the outboard wing panel assembly, the additional sacrificial plies permitting removal of the sacrificial plies to provide that the exposed noodle is flush without reducing a load bearing capability of the inboard and outboard wing panel assemblies.

* * * * *